(12) United States Patent
Brennan

(10) Patent No.: US 7,599,873 B2
(45) Date of Patent: Oct. 6, 2009

(54) SYSTEM AND METHOD FOR ETF INVESTING

(75) Inventor: Sean P. Brennan, Merrimacport, MA (US)

(73) Assignee: ETF Labs, LLC, Merrimacport, MA (US)

( * ) Notice: Subject to any disclaimer, the term of this patent is extended or adjusted under 35 U.S.C. 154(b) by 309 days.

(21) Appl. No.: 11/294,312

(22) Filed: Dec. 5, 2005

(65) Prior Publication Data

US 2007/0022039 A1  Jan. 25, 2007

Related U.S. Application Data

(60) Provisional application No. 60/700,684, filed on Jul. 19, 2005.

(51) Int. Cl.
*G06Q 99/00* (2006.01)
(52) U.S. Cl. .................................................. 705/36 R
(58) Field of Classification Search ............... 705/35–40
See application file for complete search history.

(56) References Cited

U.S. PATENT DOCUMENTS

| | | | |
|---|---|---|---|
| 6,879,964 B2 * | 4/2005 | Sauter et al. ................ 705/37 |
| 6,941,280 B1 * | 9/2005 | Gastineau et al. ......... 705/36 R |
| 7,031,937 B2 * | 4/2006 | Brown et al. ............... 705/36 T |
| 7,283,978 B2 * | 10/2007 | Frankel et al. ................ 705/35 |
| 2001/0025266 A1 * | 9/2001 | Gastineau et al. ............. 705/36 |
| 2001/0042037 A1 * | 11/2001 | Kam et al. ..................... 705/36 |
| 2003/0177084 A1 * | 9/2003 | Cassani et al. ................. 705/36 |
| 2005/0038726 A1 * | 2/2005 | Salomon et al. ............... 705/36 |

OTHER PUBLICATIONS

O'Brien, Laurel, "Nuveen Launches First Municipal Closed-End Exchange-Traded Fund Index; Index to be Calculated and Published by the American Stock Exchange", Jul. 11, 2005, Business Wire, p. 1.*

Clare Francis "Buy A Share That's Also An Index Tracker" Sunday Times London, Jul. 6, 2003.*

* cited by examiner

*Primary Examiner*—Thu-Thao Havan
*Assistant Examiner*—Thomas M Hammond, III
(74) *Attorney, Agent, or Firm*—Brian M. Dingman; Mirick, O'Connell, DeMallie & Lougee, LLP

(57) ABSTRACT

A system and method for ETF investing that provides a primary exchange traded fund (PETF) that comprises a plurality of shares, wherein the primary exchange traded fund comprises investments in a plurality of secondary exchange traded funds (SETF). The system and method enable intraday, or other periodic, trading of a variable number and type of ETFs through a single ETF, based on one or more categories and factors including, but not limited to, real-time NAVs.

13 Claims, 1 Drawing Sheet

US 7,599,873 B2

SYSTEM AND METHOD FOR ETF INVESTING

CROSS-REFERENCE

This application claims priority of U.S. patent application Ser. No. 60/700,684 filed on Jul. 19, 2005.

FIELD OF THE INVENTION

This invention relates to a system and method for investing through exchange-traded funds (ETFs) and more specifically, in the preferred embodiment of the system and method, to investing through ETFs that comprises a plurality of other ETFs.

BACKGROUND OF THE INVENTION

An ETF is an investing tool that is similar to stocks, except that the shares of a given ETF represent an index of stocks, other securities or other investments rather than a single company stock. Similar to mutual funds, ETFs provide an investor with various types of diversity within a single fund. However, ETFs provide the added benefit of lower expenses, greater transparency, better tax efficiency, and flexibility. For example, unlike mutual or index funds, whose shares may only be bought at the end of the day based on that day's closing price or net asset value as of 4:00 pm on any given day, ETF shares may be purchased intraday, at any time during the trading day, in the same way stocks are traded. Examples of ETFs are the Standard & Poor's Depository Receipt (SPDR), otherwise known as spider, that trades as a stock on the American Stock Exchange and is an index of, or otherwise represents, the S & P 500; Diamonds (DIA) that trades as a stock on the American Stock Exchange and is an index of, or otherwise represents, the thirty stocks in the Dow Jones Industrial Average; Cubes (QQQQ) that trades as a stock on the NASDAQ and is an index of, or otherwise represents, the NASDAQ 100. However, such ETFs are self-limiting because they are based on the ETF sponsor's previously selected index that, once selected and approved by the SEC, is thereafter limited to that selected index. Current ETFs are not flexible or responsive enough to investors who seek to capitalize on more sudden movements in the market.

SUMMARY OF THE INVENTION

It is therefore a primary object of the invention to provide a system and method for providing ETFs that comprise shares from other ETFs.

It is a further object of the invention to provide a means through which investors may capitalize on sudden movements in the marketplace.

A preferred method of investing of the invention generally comprises the steps of: providing a primary exchange traded fund (PETF) comprising a plurality of shares, wherein the primary exchange traded fund comprises investments in a plurality of secondary exchange traded funds (SETF); and offering one or more of the shares for sale. The method may further comprise the step of, selling one or more of the shares to one or more qualified buyers, wherein the step of selling may comprise selling one or more of the shares intraday at an intraday share price.

The plurality of SETFs each preferably has a net asset value (NAV) wherein the PETF comprises a plurality of SETFs determined by a defined category of predetermined ETFs, and wherein each of the predetermined ETFs preferably has an NAV predetermined and ranked based on their respective NAVs. The category of ETFs may be defined as ETFs having an NAV that is within a top tier of the predetermined ETFs based on the ranking, wherein the predetermined ETFs are ranked from highest to lowest NAV and the top tier comprises the 40 or fewer highest ranked predetermined ETFs. In contrast, the predetermined ETFs may also be ranked from highest to lowest NAV and wherein the top tier comprises the 40 or fewer lowest ranked predetermined ETFs. The category of the method may be defined by one or more factors selected from a group consisting of NAV, sector, capitalization, geography, asset quality, whether an ETF is indexed or closed end, rating, security type, class, equity type, index type, number and trading trend, wherein the NAV may be calculated based on a temporal period selected from a group consisting of seconds, hours, daily, weekly, monthly, quarterly, and annually.

The step of providing in the method of the invention may further comprise the step of resetting the plurality of SETFs based on one or more factors selected from a group consisting of NAV, sector, capitalization, geography, asset quality, whether an ETF is indexed or closed end, rating, security type, class, equity type, index type, number and trading trend, and still further, or alternatively, may comprise the step of resetting the plurality of SETFs based on one or more temporal periods selected from a group consisting of seconds, hours, daily, weekly, monthly, quarterly, and annually.

The preferred embodiment of the system of the invention for ETF investing generally comprises: means for providing a primary exchange traded fund (PETF) comprising a plurality of shares, wherein the primary exchange traded fund comprises investments in a plurality of secondary exchange traded funds (SETF); and means for offering one or more of the shares for sale. The system may further comprise means for selling one or more of the shares to one or more qualified buyers, a means for selling intraday, and/or means for selling the shares at an intraday share price.

The plurality of the SETFs used in the preferred embodiment of the system of the invention may each have a net asset value (NAV), wherein the PETF comprises a plurality of SETFs determined by a defined category of predetermined ETFs, wherein each of the predetermined ETFs may have an NAV predetermined and ranked based on their respective NAVs. The category of ETFs of the system may be defined as ETFs having an NAV that is within a top tier of the category of ETFs based on the ranking, wherein the predetermined ETFs are ranked from highest to lowest NAV and the top tier comprises the 40 or fewer highest ranked predetermined ETFs or the top tier comprises the 40 or fewer lowest ranked predetermined ETFs.

The PETFs of the system may comprise a plurality of SETFs determined by a defined category of predetermined ETFs, wherein the category is defined by one or more factors selected from a group consisting of NAV, sector, capitalization, geography, asset quality, whether an ETF is indexed or closed end, rating, security type, class, equity type, index type, number and trading trend, wherein the NAV may be calculated intraday, and wherein the NAV is calculated based on a temporal period selected from a group consisting of seconds, hours, daily, weekly, monthly, quarterly, and annually.

The system of the invention may further comprise, means for resetting the plurality of SETFs based on one or more factors selected from a group consisting of NAV, sector, capitalization, geography, asset quality, whether an ETF is indexed or closed end, rating, security type, class, equity type, index type, number and trading trend. Still further, the system may comprise, means for resetting the plurality of SETFs based on one or more temporal periods selected from a group consisting of seconds, hours, daily, weekly, monthly, quarterly, and annually.

BRIEF DESCRIPTION OF THE DRAWINGS

Other objects, features and advantages of invention will occur to those skilled in the art from the following description of the preferred embodiments and the accompanying drawing in which.

DETAILED DESCRIPTION OF THE PREFERRED EMBODIMENTS AND METHODS

Figure 1:
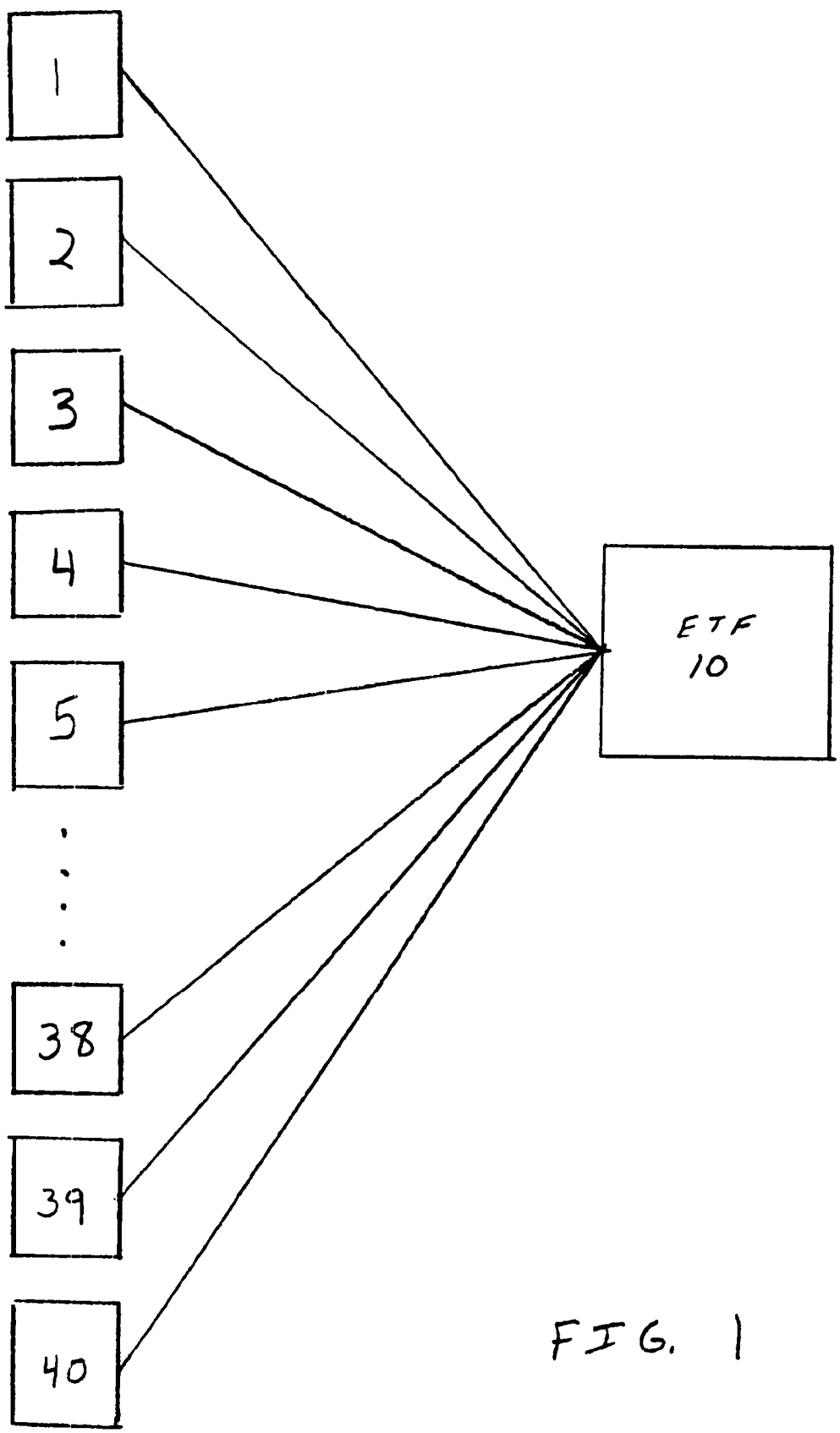
FIG. 1 is a schematic diagram of a preferred embodiment of the system and method of the invention.

The invention features a system and method that provides investors with a means for investing in a plurality of ETFs through a single ETF. A schematic diagram of a preferred embodiment of the investing system of the invention is shown in FIG. 1. The preferred embodiment, shown in FIG. 1, is an ETF made up of shares from other ETFs and is generally referred to herein as ETF 10. The preferred embodiment of the invention is a real-time ETF preferably based, at least in part, on real-time NAVs. Although the embodiment shown in FIG. 1 is directed at the top forty ETFs otherwise referred to as gainers, based on their respective NAVs, the system and method of the invention may comprise and be categorized by a virtually unlimited number, type and combination of ETFs. The system and method of the invention provides an ETF that can be traded intraday that is comprised of shares of other ETFs that, likewise, can be traded intraday. As such, ETF 10 enables an investor to capitalize on sudden movements in the marketplace as defined by the ETFs that make up ETF 10.

The embodiment, shown and referred to as ETF 10, comprises a plurality of other ETFs. ETF 10 is made up of the top forty ETFs having the highest NAV (gainers). More specifically, for example, the actual forty ETFs making up ETF 10 are the forty ETFs having the highest NAVs at any given point intraday. The ETF of the invention is not limited to intraday. For illustration, the point at which the top forty, for example, are determined can be calculated, and/or reset, based on any temporal definition including but not limited to intraday for any time period (from seconds to hours), daily, weekly, monthly, quarterly, and/or annually. As such, the ETFs making up ETF 10 would likely change over the course of a given trading day, or whatever the set period, as the NAVs of all the ETFs change over the course of the trading day or set period. For example, ETFs can be traded at least every thirty seconds which means that the actual ETFs making up ETF 10 could conceivably change at least every thirty seconds. Some of the exchanges can calculate changes even faster or more frequently. The speed at which the actual ETFs making up ETF 10 may change is only limited to the extent that the exchange on which the underlying ETFs are traded is able to calculate the NAV of the underlying ETFs. As such, an investor of ETF 10 or any other ETF of the invention, could rapidly respond to a sudden shift in the overall marketplace or a particular market by investing or divesting shares of the ETF of the invention at a moment's notice. For illustration only, one or more embodiments of the ETF of the invention may be defined as follows: (Top 5/10/25/50/up NAVs)+(subscriptions+or redemptions−)=new real-time NAV.

The system and method of the invention preferably utilizes the computer program of the invention to automatically manage ETF 10 electronically. The program for a given ETF of the invention is defined by preset rules, which, in the case of ETF 10, would be based on the NAV for all ETFs. The system would then buy and sell other ETF shares as frequently as desired or otherwise at minute time intervals based on their respective NAVs for a given momentary time interval as determined by the calculation speed of the given exchange.

As noted, the system and method of the invention is not limited to the top forty ETFs or any other type of top tier designation such as gainers. Investors just as frequently may want to investors in the bottom forty ETFs or bottom tier ETFs, otherwise referred to as losers. The essential aspects of the system and method of the invention is to provide an ETF that can be traded intraday and is made up of a plurality of other ETFs. The number and type of ETFs selected or defining an ETF of the invention is virtually limitless and likely would depend on any restrictions or minimum numbers set by the SEC or other regulatory institution. Typically, ETFs and other traded funds are defined by market, class, region, equity and/or security type. Below is an illustrative, but in no way limiting, list of other possible ETFs of the invention:

1. An ETF that comprises the bottom forty (40) ETFs based on NAV.
2. An ETF that comprises the top ten ETFs in the real estate sector.
3. An ETF that comprises the bottom ten ETFs in the real estate sector.
4. An ETF that comprises the top twenty indexed ETFs.
5. An ETF that comprises the top twenty closed-end ETFs.

Any one of these ETFs can be further or alternatively structured based on any number of sector relevant variables such as capitalization, geographic region, and/or asset quality. The variables and combinations are virtually limitless.

According to Thomson Financial Services, there are hundreds of ETFs, both indexed and closed-end funds, currently available in the marketplace. Each of these ETFs represents a diversified mix of shares which themselves are unique products in the public markets. Each of these ETFs invests in one specific type or specialized sector of a given industry or market. The ETF of the invention could likewise comprise the top percentage of ETFs in a specific industry or market or could, in contrast, comprise ETFs from diverse industries or markets. For example, ETF 10 is based on the top forty ETFs based on NAV alone, without regard to industry or market.

As noted, the system and method of the invention provides the trading characteristics of an ETF but adds additional layers of ETFs. The ETF of the invention provides the substantial benefit of enabling investors to instantly respond to sudden changes in the overall market or in a specific market or segment depending on whether another ETF is trading in that given market or segment. The system and method also contemplates an ETF made up of shares from a plurality of other ETFs as well as shares from stocks and/or bonds, depending on the definition, goals, or philosophy of a given ETF. In such an embodiment, the ETF of the invention could in part be electronically managed and in part be personally managed by a portfolio manager. The ETF portion could be managed electronically and the equity/security portion could be managed personally by a portfolio manager.

The system and method of the invention can be restructured and/or applied to all types of ETFs. For example, offerings using the invention can be structured as any number of closed-end funds or indexes for any and all types of markets, sectors and even more specifically to one or more types of groupings within a given sector. As noted, the only limitations are any rules set by a regulatory authority such as the SEC. The variables are innumerable and can be structured based on market demand. Depending on the structure or strategy desired, SEC requirements relating, for example, to the number of ETFs in a larger pool of ETFs would need to be followed.

The system of the invention can be structured for trading on any of the available exchanges or on an entirely new exchange formed in view of the new market capabilities of the invention. Depending on the exchange of choice, once the SEC or other jurisdictional authority approves a given ETF of the invention, the system can be run and managed through any means, acceptable to the regulatory authorities, for trading securities. The method of the invention for offering an improved ETF generally comprises the steps of: providing a primary exchange traded fund comprising a plurality of shares based on a plurality of secondary exchange traded funds; offering the shares for sale, and selling one or more of the shares to one or more qualified buyers. The step of selling may comprise selling the shares at any time intraday or at any other defined temporal point. The primary exchange traded fund preferably comprises, but is not limited to, investments in secondary exchange traded funds defined as the top tier of exchange traded funds based on their NAV. The exchange traded fund may further comprise a plurality of share classes whereby the step of selling may further comprise selling a plurality of shares specific to one or more of the share classes.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A computer-implemented method of providing investment in a number of pre-existing exchange traded funds (ETFs) through a single ETF, comprising the steps of:
    a) providing an automatically-managed primary exchange traded fund (PETF) having a plurality of PETF shares that are traded intraday, wherein the PETF has an intraday net asset value (NAV), and consists of shares of a plurality of pre-existing ETFs that are designated as secondary exchange traded funds (SETF), each SETF having a NAV that is determined intraday, and each SETF having a plurality of SETF shares that can be traded intraday;
    b) automatically selecting, according to preset rules, the SETFs in the PETF based on a defined category or pre-existing ETFs;
    c) using a programmed computer to make intraday purchases and sales of shares of the selected SETFs;
    d) using a programmed computer to calculate a real-time intraday NAV of the PETF the calculation made according to a formula that is based on the real-time intraday NAVs of all of the selected SETFs; and
    e) selling PETF shares intraday at the calculated real-time NAV of the PETF.

2. The method of claim 1, wherein each of said pre-existing ETFs has an intraday NAV, and the pre-existing ETFs are ranked based on their respective intraday NAVs.

3. The method of claim 2, wherein said defined category of pre-existing ETFs is defined as ETFs having an intraday NAV that is within a top tier of said pre-existing ETFs based on said ranking.

4. The method of claim 3, wherein said pre-existing ETFs are ranked from highest to lowest intraday NAV and said top tier comprises the 40 or fewer highest ranked pre-existing ETFs.

5. The method of claim 3, wherein said pre-existing ETFs are ranked from highest to lowest intraday NAV and said top tier comprises the 40 or fewer lowest ranked pre-existing ETFs.

6. The method of claim 1, wherein said defined category is defined by one or more factors selected from a group consisting of intraday NAV, sector, capitalization, geography, asset quality, whether an ETF is indexed or closed end, rating, security type, class, equity type, index type, and trading trend.

7. The method of claim 1, wherein the selection of the SETFs in the PETF is made based on the intraday NAVs of said pre-existing ETFs.

8. The method of claim 1 wherein shares of the SETFs are purchased and sold at sub-minute intervals.

9. The method of claim 1 wherein the selection of the SETFs in the PETF takes place intraday.

10. A computer-implemented method of providing investment in a number of pre-existing exchange traded funds (ETFs) through a single ETF, comprising the steps of:
    a) providing an automatically-managed primary exchange traded fund (PETF) having a plurality of PETF shares that are traded intraday, wherein the PETF has an intraday net asset value (NAV), and consists of shares of a plurality of pre-existing ETFs that are designated as secondary exchange traded funds (SETF), each SETF having an NAV that is determined intraday, and each SETF having a plurality of SETF shares that can be traded intraday;
    b) using a programmed computer to automatically select, according to preset rules, the SETFs in the PETF based on the NAVs of pre-existing ETFs;
    c) using a programmed computer to make intraday purchases and sales of shares of the selected SETFs;
    d) using a programmed computer to calculate the real-time intraday NAV of the PETF, the calculation made according to a formula that is based on the real-time intraday NAVs of all of the selected SETFs; and
    e) selling PETF shares intraday at the calculated real-time NAV of the PETF.

11. The method of claim 1 wherein the selection of the SETFs in the PETF is made based only on the NAVs of said pre-existing ETFs.

12. The method of claim 11 wherein the selected SETFs are those with the highest NAVs.

13. The method of claim 1 wherein the intraday purchases and sales of shares of the SETFs are made at intervals as short as 30 seconds or less.

* * * * *

UNITED STATES PATENT AND TRADEMARK OFFICE
CERTIFICATE OF CORRECTION

PATENT NO. : 7,599,873 B2  Page 1 of 1
APPLICATION NO. : 11/294312
DATED : October 6, 2009
INVENTOR(S) : Sean P. Brennan It is certified that error appears in the above-identified patent and that said Letters Patent is hereby corrected as shown below:

Claim 1 appearing in Column 5, line 45, should be corrected as follows:

b) automatically selecting, according to preset rules, the SETFs in the PETF based on a defined category "or" --of-- pre-existing ETFs;

Signed and Sealed this

Tenth Day of November, 2009

David J. Kappos
*Director of the United States Patent and Trademark Office*